Sept. 28, 1943.    R. W. STUART    2,330,394
DETECTION OF SALT IN DRILLING FLUIDS
Filed July 25, 1940    2 Sheets-Sheet 1
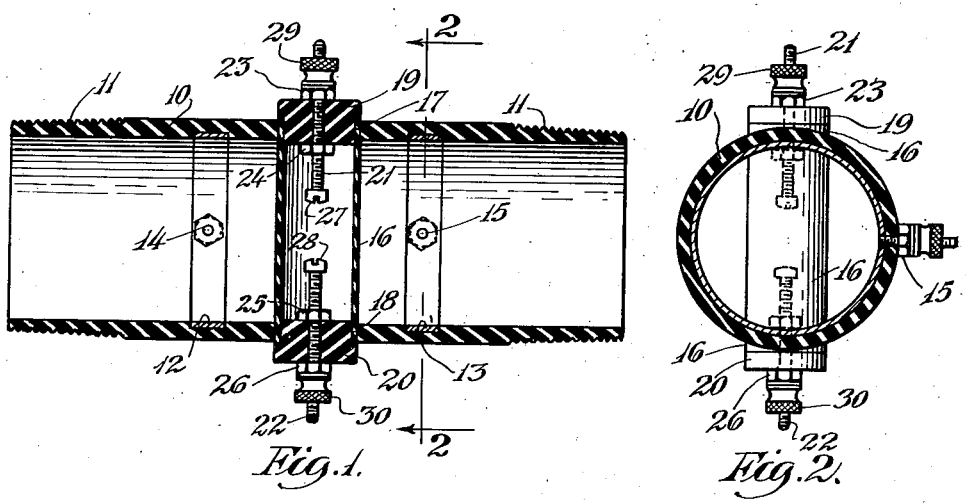
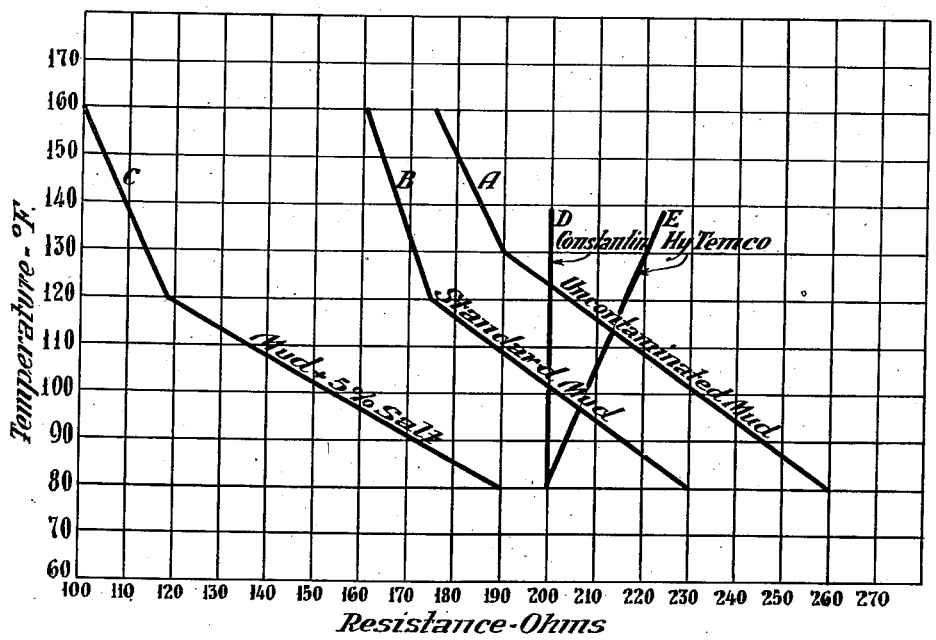
INVENTOR.
Robert W. Stuart
Clarence H. Seeley
BY
Attorney.

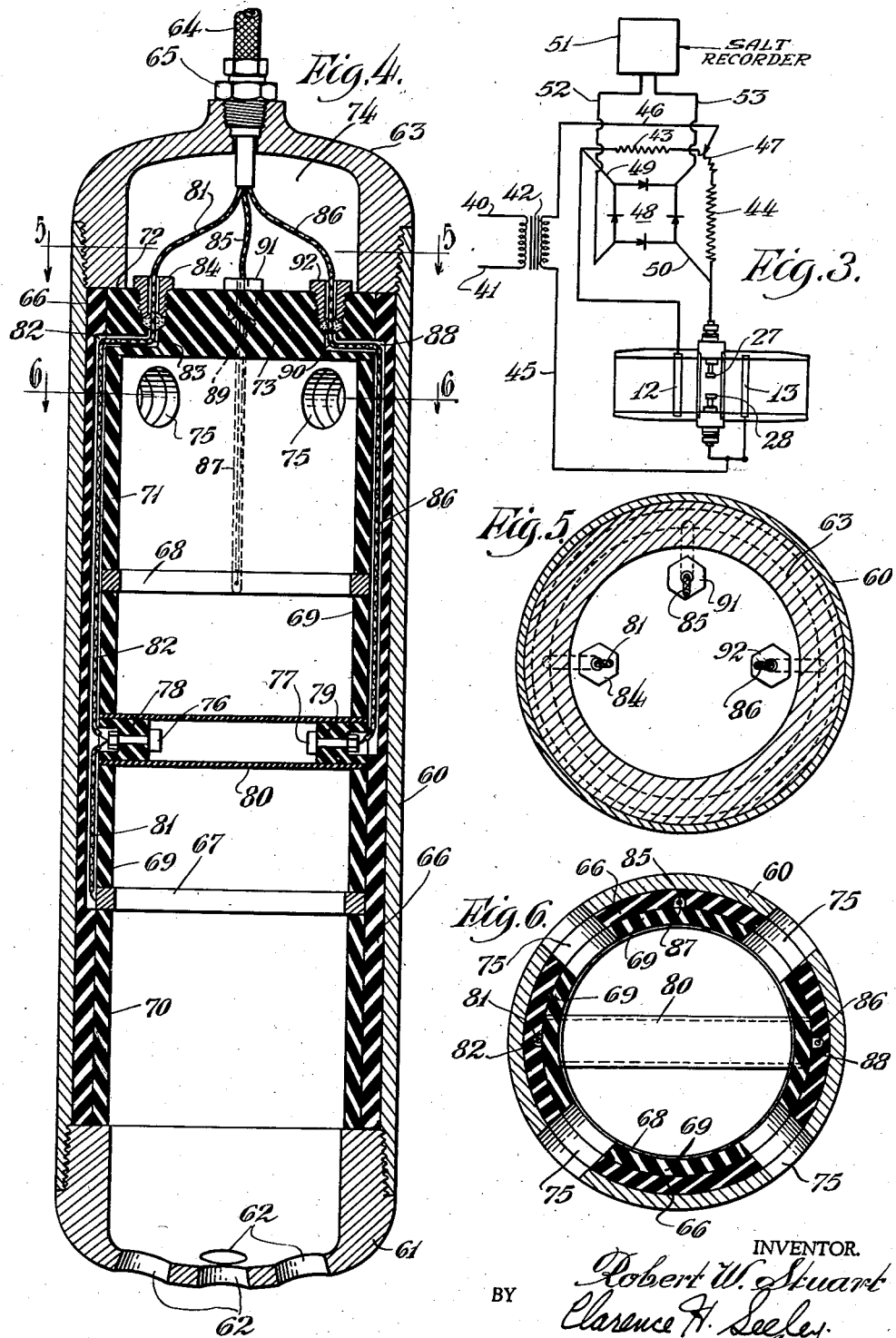

Patented Sept. 28, 1943

2,330,394

UNITED STATES PATENT OFFICE 2,330,394

DETECTION OF SALT IN DRILLING FLUIDS

Robert W. Stuart, Tulsa, Okla., assignor to Stanolind Oil and Gas Company, Tulsa, Okla., a corporation of Delaware Application July 25, 1940, Serial No. 347,570

4 Claims. (Cl. 175—182)

This invention relates to the detection and measurement of electrolytes in liquids and more particularly to an improved salt detecting apparatus for use in connection with the logging of wells during the drilling thereof employing the rotary method. Still more specifically it relates to salt detection by means of a device which is automatically compensated for variations in temperature within the range likely to be encountered in operation.

It has been recognized that variations in the electrical conductivity of drilling muds are indicative of their salt content, the conductivity change being approximately proportional to the amount of salt present, and it has been proposed to apply this knowledge by continuously measuring the conductivity of drilling fluid as it returns from the well. When the conductivity readings are relatively low, the presence of salt and/or salt water in the strata being drilled has been assumed.

Actually, however, such results have been very unreliable due to the fact that the conductivity of a typical drilling mud is greatly influenced by variations in temperature, as will be brought out more fully below. A temperature correction can be made by the use of a correction curve in which the conductivity of various muds is plotted against temperature, but this method is obviously laborious and time-consuming.

I have devised an apparatus for measuring the salt content of drilling muds and other aqueous liquids which is particularly suited for use in connection with mud logging and in which the measurement is automatically compensated for variations in temperature.

According to my invention an electrical current, preferably alternating current, is passed through an aqueous liquid and a standard sample of a material having a resistance-temperature relation like that of the liquid maintained at substantially the same temperature, and producing and measuring electrical variations responsive to variations in the relative resistances of the liquid and the sample. In a preferred form of my invention, drilling mud to be tested is introduced into a conductivity call containing two electrodes, and this cell is connected into a bridge circuit including another cell containing a standard sample of mud maintained at the same temperature. The arrangement is such that the bridge will be substantially balanced at all temperatures within the operating range, and only unbalancing due to variations in the electrical conductivity, and hence, variations in the salt content of the drilling mud in the conductivity cell, will be measured.

It is an object of my invention to provide an improved apparatus for measuring the content of salts and other electrolytes in drilling muds which includes automatic compensation for variations in temperature. Another object is to provide an improved salt detecting unit adapted for use in connection with a continuous mud logging system and capable of yielding a continuous accurate record of the salt content of the drilling mud returning from the well. A further object is to provide a temperature-compensated conductivity testing unit adapted to be lowered into a well and particularly into drill pipe. Further objects, uses and advantages of my invention will become apparent from the following detailed description considered in conjunction with the drawings, in which:

Figure 1 is a view in cross-section of a conductivity flow cell according to my invention;

Figure 2 is a cross-section along line 2—2 of the cell illustrated in Figure 1;

Figure 3 shows diagrammatically a conductivity cell together with a preferred electrical circuit whereby the salt content of mud passing therethrough is automatically recorded;

Figure 4 is a vertical cross-section of a conductivity cell according to my invention which is adapted to be lowered into a well and preferably into the drill pipe used in a rotary drilling operation;

Figure 5 is a cross-section along line 5—5 of Figure 4;

Figure 6 is a cross-section along line 6—6 of Figure 4, and

Figure 7 is a graph illustrating the behavior of a typical drilling mud and metallic materials as to variation in electrical resistance with temperature.

Referring now to Figures 1 and 2, which illustrate a conductivity cell for continuously measuring the conductivity and therefore the electrolyte content of a flowing stream of drilling mud, a tubular body portion 10 of fiber, a synthetic resin, or other electrical insulating material is provided having threads 11 at each end for connection in a line through which the liquid to be tested flows. Two split rings, 12 and 13, of brass or other electrical conducting material are sprung into spaced grooves cut in the inner surface of body 10 so that they present surfaces to the liquid flowing therein which are substantially flush with the interior of body 10. Rings 12 and 13 constitute the electrodes between which the conductivity of the flowing liquid is measured, appropriate electrical connections 14 and 15 being provided for incorporating them in the measuring circuit. The particular form of conductivity cell shown is especially suited to the testing of drilling muds since the flush construction of electrodes 12 and 13 enables the mud to flow freely by them and so keep the electrode surfaces free from contamination and solid deposits. Obviously, however, other electrode arrangements can be used.

As mentioned above, a second cell containing a standard sample of electrolyte-containing liquid is maintained at the same temperature as the flowing stream under test. This liquid must be one having a resistance-temperature relation like that of the liquid undergoing test. In testing drilling mud, the standard sample can be drilling mud containing a small amount of a soluble phosphate to minimize settling of the solids therein. As shown in Figures 1 and 2 this cell is located directly in the path of the flowing stream between electrodes 12 and 13, and consists essentially of a relatively thin-walled tube 16 of fiber or other mechanically strong electrical insulator inserted with a tight fit into appropriate holes 17 and 18 bored into body 10 on opposite sides thereof. Both ends of tube 16 are closed by means of insulating plugs 19 and 20 through which bolts 21 and 22 are axially fastened by means of nuts 23 and 24, and nuts 25 and 26, respectively. The heads 27 and 28 of bolts 21 and 22, respectively, are spaced from each other by an adjustable distance within tube 16 and these act as the electrodes in the temperature compensation cell, the electrical connections thereto being made by means of knurled nuts 29 and 30.

It is apparent that the temperature of the standard fluid within tube 16 will remain very close to that of the flowing stream due to the indirect heat exchange relationship as long as the variations in the temperature of the latter are not too abrupt. In mud logging practice the temperature variations are seldom abrupt and the conductivity test-unit above described is therefore well adapted to be used for continuously testing drilling mud returns.

In order to obtain the desired results according to my invention the effects of changing conductivities between electrodes 12 and 13 and between electrodes 27 and 28 are compared on a bridge circuit. By way of example I have shown in Figure 3 a bridge circuit particularly suitable for recording the salt content of drilling muds. The flow cell itself is shown in highly simplified form with electrodes 12 and 13 representing those exposed to the flowing mud and electrodes 27 and 28 representing those in the temperature compensating cell. Although direct current can be used under some circumstances for the conductivity test, I greatly prefer alternating current in order to avoid the difficulties arising from polarization, and this is supplied to the system from conductors 40 and 41 through transformer 42. The output from the secondary winding of transformer 42 is applied to one diagonal of a Wheatstone bridge network consisting of resistances 43 and 44 and the cells containing electrodes 12 and 13 and electrodes 27 and 28 by means of conductors 45 and 46, the latter conductor being connected to potentiometer type resistance 47 located in the circuit between resistances 43 and 44. The purpose of resistance 47 is to facilitate the preliminary balancing of the bridge circuit. The potential difference across the other diagonal of this bridge is applied to a conventional bridge rectifier 48 by means of leads 49 and 50 and the rectified output is then impressed on meter 51 via conductors 52 and 53. Meter 51 is adapted to measure variations in direct current and preferably is of a recording type.

It will be apparent that the apparatus hereinabove described is capable of measuring and recording variations in the relative conductivities (or resistivities) of the liquid stream between electrodes 12 and 13 and the standard liquid sample between electrodes 27 and 28. As already stated this results in accurate determination of the electrolyte content of the flowing stream even at varying temperatures because the effect of a temperature change in the flowing liquid on the resistivity thereof is automatically compensated by a corresponding change in the resistivity of the liquid in the cell between electrodes 27 and 28. The importance of this compensation can be readily seen from the resistivity-temperature curves shown in Figure 7 to which reference is now made.

Curves A, B and C, respectively, represent the resistance-temperature relationship of an uncontaminated drilling mud, a sample of drilling mud containing a small amount of an electrolyte prepared for use as a standard, and the same mud as that giving curve A to which 5 per cent of salt had been added. It will be observed that in each of these cases the resistance-temperature relationship is very nearly the same, so that the temperature compensation system described above will give much more accurate results than any other method. Curves D and E demonstrate that the coefficients of typical metallic resistances are very different from those of drilling muds, and cannot be used for temperature compensation in a bridge circuit.

Figure 7 also demonstrates beyond a doubt the extreme importance of compensating for temperature variations, since without this feature each 10° F. increase in temperature will give approximately the same change in resistivity (or conductivity) of a typical drilling mud, as will 1 per cent of added salt.

My invention also is applicable to the measurement of the conductivity of the drilling fluid within a well, and in that application the feature of automatic temperature compensation is particularly important since, as is well-known, subterranean temperatures exceeding 200° F. are occasionally encountered in wells. There are many occasions on which such measurements are desirable. For instance, an entire well may be logged to determine the depths at which salt water intrusions occur, the conductivity unit can be lowered through the drill stem and bit during a drilling operation to determine if a formation containing salt or salt water has been penetrated, or this unit can be lowered into the drill stem just above the drill bit and mud containing fragments of the formation being drilled brought into contact therewith by means of reverse circulation.

Accordingly I have devised an improved conductivity-testing unit for use within a well, one form of which is shown in Figures 4, 5 and 6. This consists in a tubular body portion 60 of steel or other metal having a foot member 61 attached to its lower end but having a number of openings 62 therethrough for the ingress of drilling mud. A cap member 63 completely closes the upper portion of body 60 and the unit is supported by cable 64, which also contains suitable electrical conductors, by means of packing gland 65.

A tubular liner 66 of Bakelite or other electrical insulating material is inserted within body portion 60, and within liner 66 two rings, 67 and 68, of brass or other conducting metal are located and spaced from each other by tubular insulator 69, ring 67 being spaced from foot 61 by tubular insulator 70. Above ring 68 is another insulating spacer tube 71 and between the latter and sholder 72 of cap 63 is a disc 73 of insulating material, so that the interior of cap 63 is a chamber 74 which is kept free of mud. During the lowering of the conductivity testing unit, the mud in the drill pipe enters through ports 62 and leaves through ports 75 formed in body 60 and insulators 66 and 71.

The electrodes for measuring variations in conductivity are the rings 67 and 68 already described. Between them two additional electrodes 76 and 77 are supported by means of insulating blocks 78 and 79, respectively, and this entire assembly is completely surrounded by a tube 80 of an insulating material which fits into appropriate openings in tube 69. In this way a separate cell is produced in which a standard sample of drilling mud can be placed without danger of contamination by the drilling mud entering the unit through ports 62 and which allows good heat transfer between the sample within and the drilling mud outside of tube 80.

All of the electrodes have electrical connections leading to the top of the well. Insulated conductor 81 connects electrodes 67 and 76 and then extends through longitudinal groove 82 in tube 66, opening 83 and packing gland 84 in insulating disc 73 and cable 64 to the surface of the earth. Electrodes 68 and 77 have similar separate connections by means of conductors 85 and 86 extending through grooves 87 and 88, openings 89 and 90 and packing glands 91 and 92, respectively.

It is believed to be unnecessary to describe the above-ground apparatus associated with the unit just described, since it can, for example, correspond exactly to that shown in Figure 3, with electrodes 67 and 68 carrying out the functions of electrodes 12 and 13 and electrodes 76 and 77 being used as the temperature compensation electrodes in place of electrodes 27 and 28.

Many modifications may be made within the spirit of my invention such as automatically compensating for the effect of temperature variations on the conductivity of the mud streams entering and leaving the well being drilled, and then obtaining a measure of the amount of salt picked up by the mud in the hole by means of another Wheatstone bridge arrangement.

While my invention has been described in connection with certain examples, I do not desire to be limited thereto, but only by the scope of the appended claims.

I claim:

1. Apparatus for measuring the salt content of drilling mud comprising a body member having an inlet and an outlet for said drilling mud, a pair of ring shaped electrodes received within said body member and insulated from each other by said body member, said ring shaped electrodes presenting interior surfaces substantially flush with the inner surface of said body member, a tubular insulator mounted between said ring shaped electrodes with its axis substantially perpendicular to the axis of said body member and holding a sample of liquid in indirect heat exchange relationship with said drilling mud and electrically insulated therefrom, a second pair of electrodes within said last-mentioned means, and means for measuring the relative electrical resistances across said pairs of electrodes.

2. Apparatus for measuring the salt content of drilling mud comprising a body member having an inlet and an outlet for said drilling mud, a pair of ring shaped electrodes received within said body member and insulated from each other by said body member, said ring shaped electrodes presenting interior surfaces substantially flush with the inner surface of said body member, a tubular insulator mounted between said ring shaped electrodes with its axis substantially perpendicular to the axis of said body member for holding a sample of liquid in indirect heat exchange relationship with said drilling mud and electrically insulated therefrom, a second pair of electrodes within said last-mentioned means, means for measuring the relative electrical resistances across said pairs of electrodes, said last mentioned means including a bridge circuit having the resistances between said pairs of electrodes as two arms thereof, means for supplying an alternating current to said bridge circuit, means for rectifying the output of said bridge circuit, and means for measuring and recording said rectified output.

3. Apparatus for measuring the salt content of drilling mud comprising a body member having an inlet and on outlet for said drilling mud, a pair of electrodes received within said body member and insulated from each other, a container mounted between said electrodes, extending across said body member and holding a sample of liquid in indirect heat exchange relationship with said drilling mud, a second pair of electrodes within said last-mentioned means, and means for measuring the relative electrical resistances across said pairs of electrodes.

4. Apparatus for measuring the salt content of drilling mud comprising a body member having an inlet and an outlet for said drilling mud, a pair of ring shaped electrodes received within said body member and insulated from each other by said body member, said ring shaped electrodes presenting interior surfaces substantially flush with said inner surface of said body member, a tubular insulator mounted in the vicinity of said ring shaped electrodes with its axis perpendicular to the axis of said body member and holding a sample of liquid in indirect heat exchange relationship with said drilling mud and electrically insulated therefrom, a second pair of electrodes within said last-mentioned means, and means for measuring the relative electrical resistances across said pairs of electrodes.

ROBERT W. STUART.

CERTIFICATE OF CORRECTION.

Patent No. 2,330,394.  September 28, 1943.

ROBERT W. STUART.

It is hereby certified that error appears in the printed specification of the above numbered patent requiring correction as follows: Page 1, first column, line 47, for the word "call" read --cell--; page 3, first column, line 12, for "sholder" read --shoulder--; and that the said Letters Patent should be read with this correction therein that the same may conform to the record of the case in the Patent Office.

Signed and sealed this 30th day of November, A. D. 1943.

(Seal)

Henry Van Arsdale,
Acting Commissioner of Patents.